United States Patent [19]
Hulyalkar

[11] Patent Number: 5,452,015
[45] Date of Patent: Sep. 19, 1995

[54] METHOD AND APPARATUS FOR COMBATING CO-CHANNEL NTSC INTERFERENCE FOR DIGITAL TV TRANSMISSION

[75] Inventor: Samir N. Hulyalkar, White Plains, N.Y.

[73] Assignee: Philips Electronics North America Corporation, New York, N.Y.

[21] Appl. No.: 197,773

[22] Filed: Feb. 10, 1994

[51] Int. Cl.⁶ ............................................. H04N 5/38
[52] U.S. Cl. ..................... 348/608; 348/21; 348/409; 375/346
[58] Field of Search ............... 348/607, 726, 608, 21, 348/611, 409, 618; 455/296, 308, 63; 375/99, 102, 103; H04N 5/38, 5/455

[56] References Cited

U.S. PATENT DOCUMENTS

| | | | |
|---|---|---|---|
| 3,652,992 | 3/1972 | Koll | 340/146.3 |
| 4,833,693 | 5/1989 | Eyuboglu | 375/99 |
| 5,086,340 | 2/1992 | Citta et al. | 358/141 |
| 5,087,975 | 2/1992 | Citta et al. | 358/183 |
| 5,121,203 | 6/1992 | Citta | 358/141 |
| 5,181,112 | 1/1993 | Citta et al. | 348/608 |
| 5,325,188 | 6/1994 | Scarpa | 375/103 |

OTHER PUBLICATIONS

VSB Transmission System Zenith Electronics Corporation, Dec. 17, 1993.
Summary Description of Terrestrial and Cable Bakeoff Systems, General Instrument, Jan. 17, 1994.
Technical Details–Digital Spectrum Compatible, Zenith, Sep. 23, 1991.
Channel Compatible Digicipher HDTV System, Massachusetts Institute of Technology, Apr. 3, 1992.
Digicipher HDTV System Description, General Instrument Corporation, Aug. 22, 1991.
Advanced Digital Television, Philips Laboratories, Jan. 20, 1992.
Precoding Technique for Partial–Response Channels With Applications to HDTV Transmission, IEEE Journal, vol. 11, No. 1, Jan. 1993.
Detection of Coded Modulation Signals on Linear, Severely Distorted Channels Using Decision–Feedback Noise Prediction With Interleaving, IEEE Journal, vol. 36, No. 4, Apr. 1988.
New Automatic Equaliser Employing Modulo Arithmetic, Electronics Letters, vol. 7, Nos. 5/6, Mar. 25, 1971.
Matched–Transmission Technique for Channels With Intersymbol Interference, IEEE Journal, vol. COM–20, No. 4, Aug. 1972.

*Primary Examiner*—James J. Groody
*Assistant Examiner*—Jeffrey S. Murrell
*Attorney, Agent, or Firm*—Michael E. Marion

[57] ABSTRACT

A rejection filter for use at an ATV receiver which is designed to process co-channel interference so as to produce at the filter output of the filter, a residual interference spectrum which is as flat as possible. The filter exploits the fact that only the picture and the sound carriers need to be sufficiently attenuated and cancels NTSC co-channel interference with only a small degradation in performance when AWGN is also present.

8 Claims, 10 Drawing Sheets

METHOD AND APPARATUS FOR COMBATING CO-CHANNEL NTSC INTERFERENCE FOR DIGITAL TV TRANSMISSION

BACKGROUND OF THE INVENTION

The Federal Communications Commission and cable television testing organizations such as CableLabs have been evaluating digital television delivery systems in order to choose a new television "standard" which someday will replace NTSC in the United States. These systems all involve digital coding and data compression techniques, for example those utilizing the MPEG digital coding algorithms or variations thereof.

The FCC plans to test and approve an advanced television (ATV) standard comprising for example, high definition television (HDTV) and standard definition (SDTV) digital signals for terrestrial broadcasting in 1994. Although the specifics of the standard are yet to be fully tested and agreed upon, the FCC has indicated that the system will initially take the form of a so called "simulcast" approach. The new ATV signals will have to fit into currently unused television channels (so-called "taboo" channels) and initially co-exist with conventional analog television signals without co-channel interference.

NTSC will be used hereinafter to represent one example of conventional television broadcasting. Other examples would be SECAM and PAL. Although NTSC is exemplified herein, it is not meant to be construed as a limitation and will be used herein synonymously with "conventional" to represent conventional television in general.

In 1994 the FCC will test the so-called "Grand Alliance" system, a system which is being cooperatively developed by the corporate sponsors which developed the first round of individual proposals which were tested by the FCC in 1991 and 1992. This system proposes to take the best features from those systems already tested in order to present a single optimum system for FCC approval as the U.S. standard.

The Grand Alliance has already decided on a coding algorithm which will comply with the source coding standards proposed by MPEG (Motion Pictures Experts Group). In addition, two RF transmission schemes will be evaluated for best performance at a "bakeoff" at the Advanced Television Test Center (ATTC) and one will be selected for inclusion in the Grand Alliance system.

The first system, which was proposed by the American Television Alliance comprising of Massachusetts Institute of Technology (MIT) and General Instrument (GI) Corporation, is described in "Channel Compatible Digicipher HDTV System", Apr. 3, 1992 and also in "Digicipher HDTV System Description", Aug. 22, 1991 which are incorporated by reference herein. This system has been further modified for the bakeoff, the details of which are described in "Summary Description of Terrestrial and Cable Bakeoff Systems" Jan. 17, 1994, which is incorporated by reference herein. This system features the use of quadrature amplitude modulation (QAM).

The second system, which was developed by Grand Alliance member Zenith Electronics Corporation, utilizes a multi-level vestigial sideband (VSB) modulation approach which is described in "Digital Spectrum Compatible—Technical Details" Sep. 23, 1991 and which was recently modified for the bakeoff and described in "VSB Transmission System: Technical Details", Dec. 17, 1993. Both of these publications are incorporated by reference herein.

A third system was proposed by the Advanced Television Research Consortium (ATRC), which included Grand Alliance members Philips Electronics, North America Corporation, David Sarnoff Research Laboratories and Thomson Consumer Electronics, and described in "Advanced Digital High Definition Television—System Description", Jan. 20, 1992 which is incorporated by reference herein. The ATRC system also featured the use of QAM.

All of these systems proposed different methods to alleviate the degradation in performance of the "simulcast" ATV transmission system caused by the co-channel conventional television transmission.

In the GI/MIT approach, the receiver equalizer is made very large to compensate for the co-channel conventional television interference.

In the Zenith approach, a comb filter is used in the receiver to introduce nulls in the digital spectrum at the locations of the co-channel (e.g. NTSC) picture, color and the sound carriers. This provides a significant improvement in performance when conventional television, e.g. NTSC, is broadcast on a co-channel.

The ATRC system introduces a null in the transmission spectra of the HDTV signal at the picture carrier by transmitting QAM over two separate carriers which are frequency division multiplexed into frequencies above and below the picture carrier respectively.

From the test results on these systems, it was observed that the ATRC system performed best when co-channel NTSC, interference was present. The ATRC system did not perform as well however in the presence of additive white Gaussian noise (AWGN).

In the initial Zenith approach, a 4 VSB modulation scheme was used. This was then modified to a trellis-coded 8 VSB modulation approach.

In the Zenith 4 VSB approach, the data in the transmitter is pre-coded to eliminate error propagation and related to the post-comb used in the receiver in a unique way, as described in U.S. Pat. Nos. 5,086,340, 5,087,975 and 5,121,203 which are incorporated by reference herein. To reduce co-channel NTSC interference, Zenith uses a comb filter with a delay element of 12 symbol intervals, as described in the '975 patent. For a delay of 12 symbols in the comb filter, it is necessary to have a delay element of exactly 12 symbols in the pre-coder (located at the transmitter) as well. Thus, when co-channel interference is present, the combination of the pre-coder and the comb filter provides good performance.

When co-channel NTSC interference is absent and only AWGN is present however, the use of a comb filter at the ATV receiver causes a loss in error performance of 3 dB. This is because of the structure of the comb filter which has a single delay of 12 symbols adding to the direct path which causes the noise to be added as well. This is discussed in the '340 patent. Hence, when co-channel NTSC interference is absent, an alternate path is provided at the receiver. This alternate path performs a post-coding operation which is simply the inverse of the pre-coding operation at the transmitter. The decision on whether the comb filter path or the post-coder path is selected depends upon the measured error-rate of the periodically sent data field sync symbols at the outputs of both the post-coder and the comb filter paths. Whichever error is smallest at the end of a preset period determines whether the post-coder or comb filter is active. This is described in section 6.3.9 of the reference "Digital Spectrum Compatible—Technical Details".

When trellis coding is introduced with the 8 VSB approach however, it is not possible to implement a similar post-coder path, since "soft-decision" Viterbi decoding is used with trellis coding as described in "Principles of Digital Communication and Coding" authored by A. J. Viterbi and J. K. Omura and published by McGraw Hill in 1979, which is incorporated by reference herein. Hence, use of a comb filter at the receiver will always result in a 3 dB loss, outweighing any advantages that the trellis-coding may provide in terms of improved performance for an AWGN channel.

The solution proposed by Zenith for trellis coder VSB is to remove the pre-coder at the transmitter, and then treat the comb filter at the receiver as a partial response channel in cascade with the trellis coder when co-channel conventional television interference is present. An optimum decoder can then be developed which uses Viterbi decoding on an expanded trellis, the states of which correspond to the cascade of the states of the comb filter and the trellis coder as described in "Principles of Digital Communication and Coding".

For a comb filter with a delay of 12 symbols however, the number of trellis states is extremely large. To simplify their design, Zenith first converts the MPEG coded and RS (Reed-Solomon) coded and interleaved serial data-stream to a parallel data stream and then uses 12 parallel trellis encoders followed by a parallel-to-serial converter at the transmitter. The trellis decoder implements Viterbi decoding on a trellis when the post-comb filter is used, with the number of states being equal to two or four times the number of states of the trellis encoder. This is described in detail in "VSB Transmission System: Technical Details".

When co-channel conventional television interference is absent, Viterbi decoding is implemented on a trellis with the number of states equal to the number of states of the trellis encoder. This is possible since pre-coding is not used in the transmitter. As in the 4 VSB case, the choice between the path afforded by simple trellis decoding or of that using the post-comb filter and the expanded trellis at the receiver is decided by the measured error-rate of the periodically sent data field sync symbols at the outputs of the post-comb filter and with no post-comb filter.

When both co-channel interference and AWGN are present however, the performance of the comb filter degrades dramatically. This is because the AWGN after the comb filter does not remain "white", but gets "colored", in other words the noise samples are not independent of each other. This affects the performance of the trellis decoder which is optimized for performance in an AWGN channel. Since the co-channel conventional television interference is maximum at the fringe area where the signal power is small and hence the AWGN is large, this is indeed a scenario which must be taken into account. A first object of the instant invention is therefore, to improve the performance of an ATV receiver when co-channel interference and a high AWGN level are present.

The number of states of the trellis encoder is limited by the fact that the Viterbi decoder for the comb-filter path must operate on a trellis with at least double the number of states of the trellis encoder. This limits the AWGN performance of the trellis encoder/decoder when co-channel television interference is not present. A second object of the instant invention therefore, is to improve the AWGN performance of the trellis encoder/decoder in an ATV receiver when co-channel television interference is not present.

Finally, the switching between the use of a comb filter in the receiver or not, suggested by Zenith is cumbersome. A significant number of computations must be performed to determine whether the comb filter should be used or not. Furthermore the use of the comb filter also specifies the use of 12 parallel encoders and correspondingly 12 parallel decoders which also is cumbersome. Another object of the invention therefore is to avoid the use of a comb filter at the receiver.

SUMMARY OF THE INVENTION

The invention comprises a rejection filter for use at the ATV receiver which is designed to process co-channel interference so as produce at the filter output of the filter, a residual interference spectrum which is as flat as possible. The comb filter used by the Zenith system does more than remove the picture and the sound carriers; it also removes the color sub-carrier and introduces other nulls in the spectrum. Hence, the residual interference has a spectrum shaped by the comb filter which is not flat. In other words the comb filter enhances the AWGN that passes through it. The rejection filter of the invention is not a comb filter and it exploits the fact that only the region around the picture carrier need be removed and the sound carrier attenuated in order to remove most of co-channel interference.

One feature of the instant invention is that it utilizes a generalized rejection filter instead of a comb filter and therefore does not enhance AWGN which passed through it. It is not necessary for the states of the trellis for Viterbi decoding to be expanded. No switching function is performed, i.e., the rejection filter is present whether co-channel conventional television interference is present or not. Thus the same system provides robust performance against both the co-channel conventional television interference and AWGN.

Another feature of the instant invention is that the number of states of the trellis encoder is not limited by the complexity of the comb filter and thus can now be increased to provide superior performance when AWGN is present.

The rejection filter can be used for 4 VSB system as well, providing superior performance as compared to a comb filter when both co-channel interference and AWGN is present. With appropriate changes for the correction of the QAM carrier, this filter can be modified for use with a QAM signal as well. These changes are similar to the modification method described for the comb filter in "Precoding Technique for Partial-Response Channels with Applications to HDTV Transmission", by L. F. Wei in IEEE Journal on Selected Areas in Communications, January 1993, pages 127–135, which is incorporated by reference herein. In general, the rejection filter can be used for any signal spectrum occupying a conventional television channel bandwidth, for example, OFDM (orthogonal frequency-division multiplexed) modulation. For the purposes of illustration however, only the rejection filter for VSB is described in detail herein.

Another feature of the invention is that the rejection filter cancels NTSC interference with only a small degradation in performance when AWGN is also present. For the embodiment described herein, this loss is less than about 0.3 dB.

An additional feature of an embodiment of the invention is that the data can be precoded at the transmitter so that error propagation is avoided at the receiver.

Another feature of the invention is that the data component for the case when pre-coding is not used which passes through the rejection filter is removed by using data decisions, i.e. using a decision-directed approach. These decisions may cause error-propagation which can be minimized using the decisions made after the trellis decoder and exploiting the correlation between the interference samples corresponding to adjacent lines.

Still another feature of an embodiment of the invention is that a symbol interleaver is disposed between the trellis encoder and the pre-coder at the transmitter and correspondingly a symbol de-interleaver is disposed at the receiver between the rejection filter and the trellis decoder, in order to "whiten" the noise input to the trellis decoder. This solves the problem of "colored" noise discussed above and also causes the residual interference frequency spectrum to appear more flat after the de-interleaving process and will break the bursts of incorrect rejection caused by co-channel television signals with extreme variations in amplitude in certain image areas. Note that such arbitrary interleaver is not possible to implement in the Zenith approach using 8VSB.

Still another feature of another embodiment of the invention is that no switching operation need be performed to decide whether the rejection filter is used or not, when the data is precoded at the transmitter. The NTSC rejection filter is always used, because even when co-channel NTSC is absent, the loss in performance in the presence of AWGN is less than about 0.3 dB.

DETAILED DESCRIPTION OF PREFERRED EMBODIMENTS OF THE INVENTION

Figure 1:
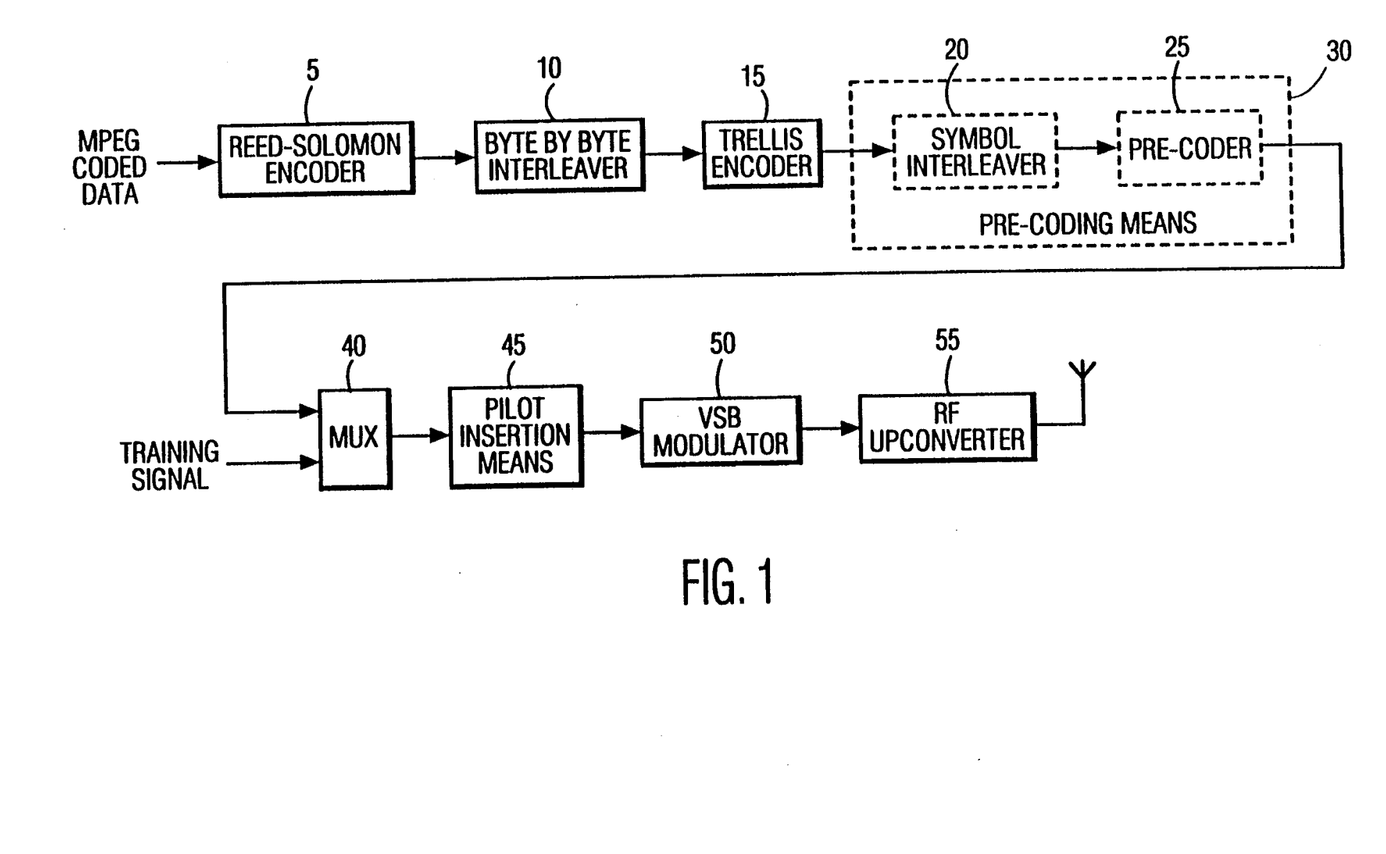
FIG. 1 is a block diagram of the VSB transmitter comprising the invention.

FIG. 1 describes the Zenith VSB communication system described in "VSB Transmission System: Technical Details" which has been modified in accordance with the invention.

The MPEG coded data (or, more generally, digital television data) is processed by Reed-Solomon (RS) encoder 5, byte interleaver 10 and then the trellis encoder 15. These three blocks are well-known and described, for example, in "VSB Transmission System: Technical Details".

The symbol interleaver 20 randomizes the trellis-coded symbols before they are processed by the pre-coder 25 symbol interleaver 20 can be implemented as a block interleaver or as a convolutional interleaver; both implementations are described in U.S. Pat. No. 3,652,998. The implementation of the pre-coder 25 is described in FIG. 7 and will be explained later.

Interleaver 20 and pre-coder 25 together form signal precoding means 30. The output of the pre-coder 25 is passed through a multiplexer (MUX) 40, which also multiplexes any training signals that are used. A pilot signal is inserted into the multiplexed data stream by pilot insertion means 45. The multiplexed data stream is then passed through a VSB modulator 50 and RF up-converter 55, after which it is transmitted over a communications path, for example a terrestrial broadcast channel. Blocks 40, 45, 50, 55 are described in "VSB Transmission System: Technical Details" as well as "Digital Spectrum Compatible—Technical Details" referred to above.

Figure 2:
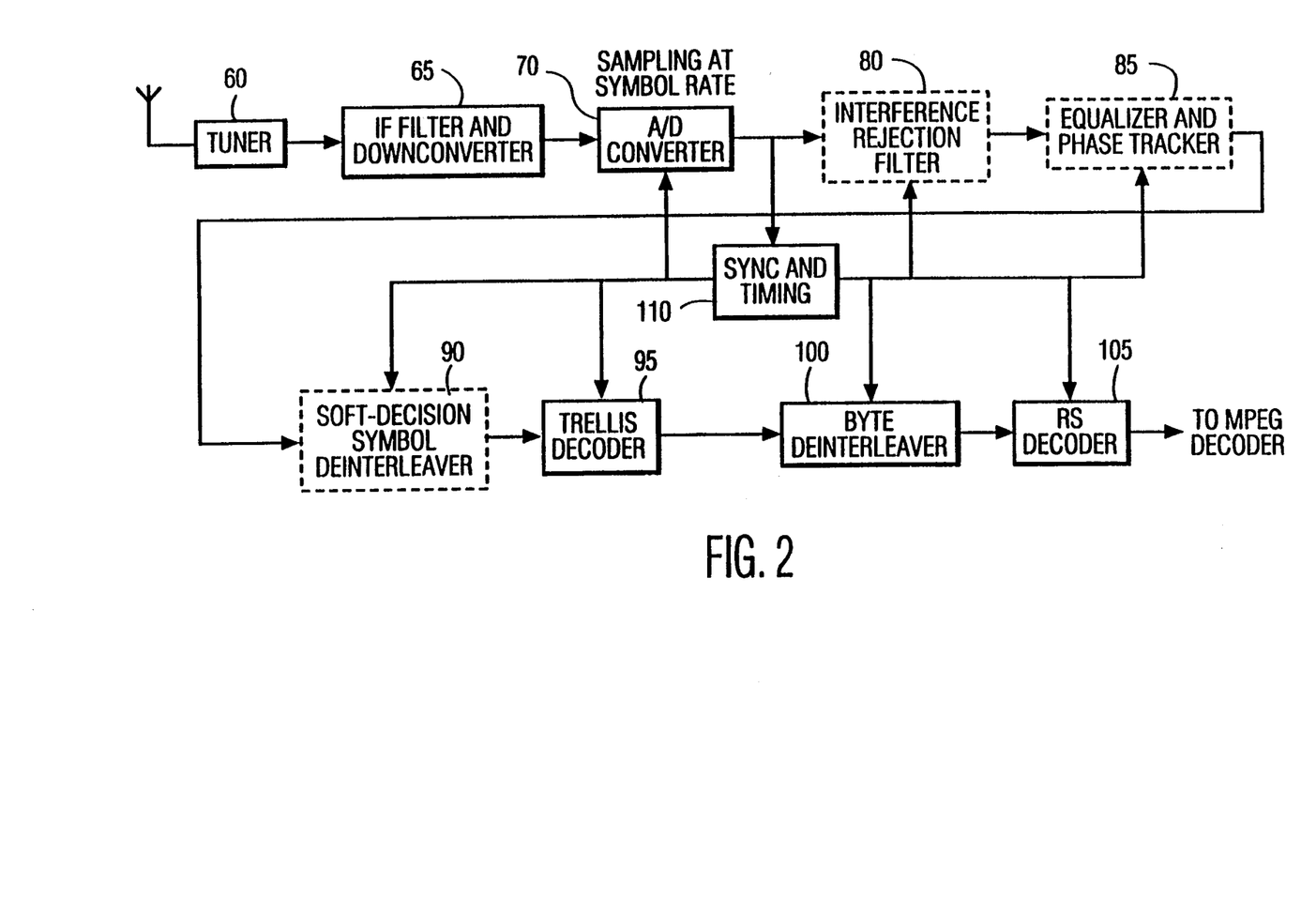
FIG. 2 is a block diagram of a VSB receiver comprising the invention.

FIG. 2 describes the block diagram of a VSB receiver comprising the invention. Tuner 60 selects the terrestrial channel of interest and converts the received signal from RF to IF, where the IF filter and downconverter 65 can be, for example, a Surface Acoustic Wave (SAW) filter (which shapes the signal spectrum according to the filter used in the VSB modulator 50) followed by a mixer which downconverts it to a baseband signal, as explained in greater detail in "Digital Spectrum Compatible—Technical Details".

Analog-to-digital (A/D) converter 70 samples the signal at symbol-rate which is, for example, 10.76 MHz. The interference rejection filter 80, described in more detail in FIG. 3, then processes the sampled signal and passes it to the equalizer and phase tracker 85 which is described in more detail in FIG. 8. The soft-decision symbol interleaver 90 essentially performs the inverse operation of the symbol interleaver 20, except that the symbols have "soft" decision information as described in "Principles of Digital Communication and Coding".

The output of the symbol deinterleaver 90 is then passed through a trellis decoder 95, byte deinterleaver 100 and RS decoder 105 which are all discussed in detail in "VSB Transmission System: Technical Details".

Sync and timing block 110 controls the clocking for each of the digital signal processing blocks and also the A/D converter 70.

Figure 3:
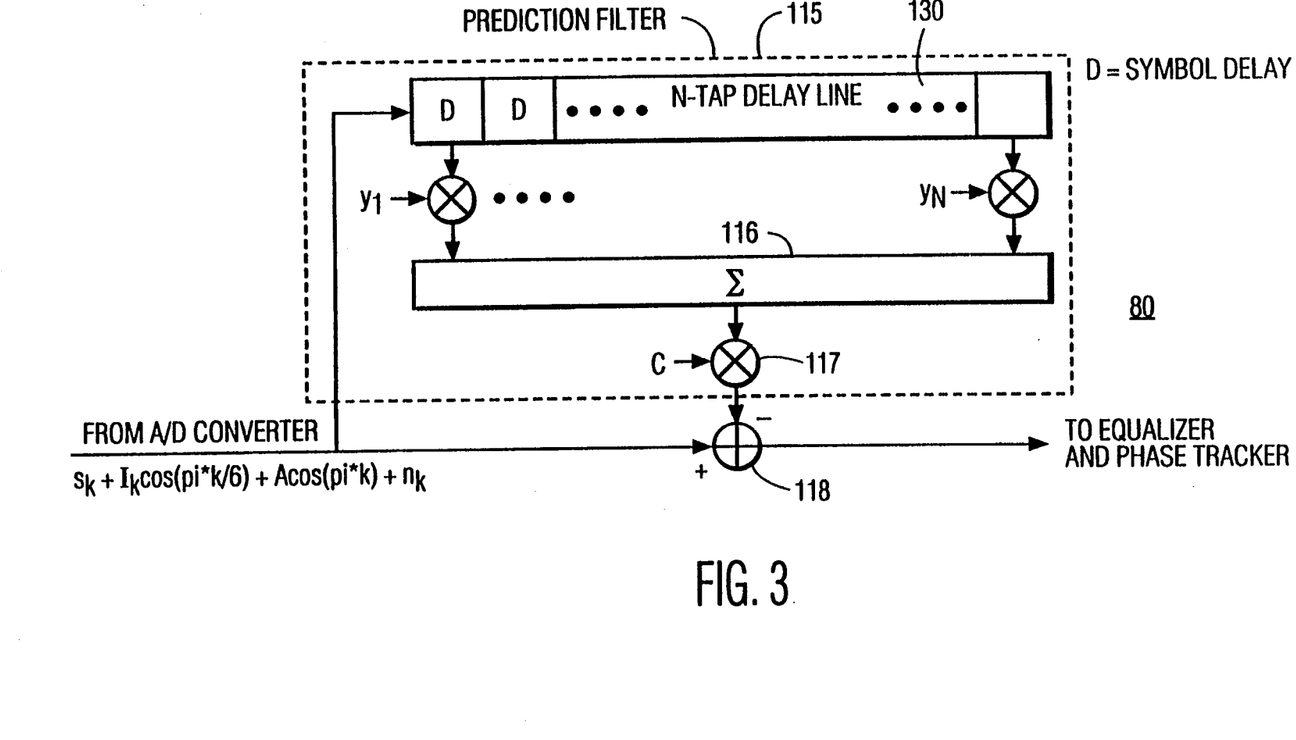
FIG. 3 describes an interference rejection filter in accordance with the invention.

The interference rejection filter 80, shown in FIG. 3, consists of a prediction filter 115, which provides estimates on the deterministic parts of an interfering co-channel (e.g. NTSC) signal. The output of the prediction filter 115 is then subtracted out of the input signal from A/D converter 70 in subtractor 118. The prediction filter 115 consists of an N-tap delay line, where each delay is equal to one symbol interval, which is the reciprocal of the A/D sampling rate of 10.76 MHz. After summing the products of each delay line and its respective filter coefficient in summer 116, a final scaling constant C operating on the sum in multiplier 117 provides the output signal of the prediction filter.

Figure 9:
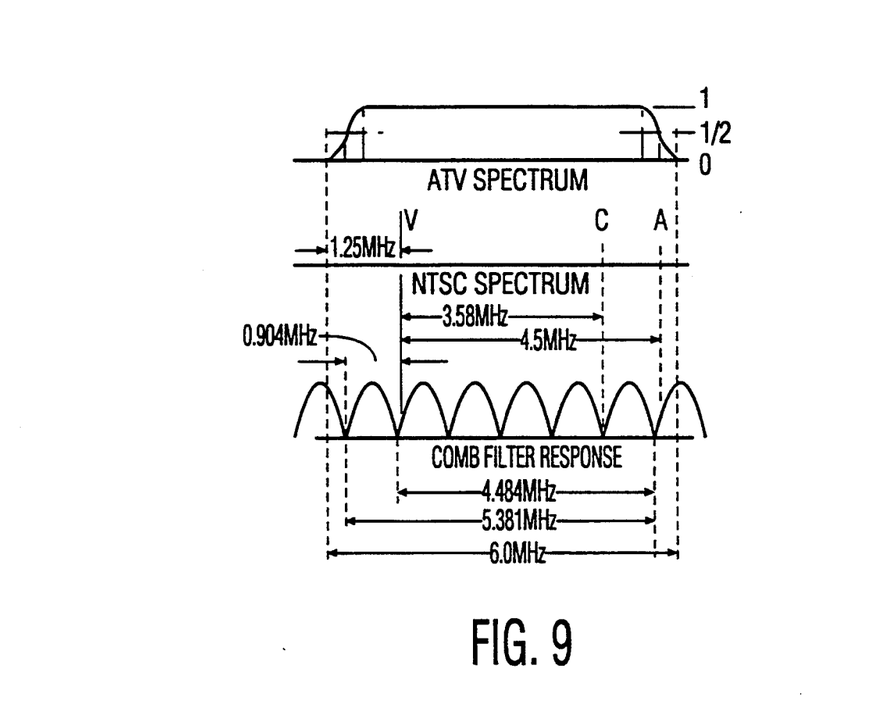
FIG. 9 illustrates the relationship between an ATV signal, a co-channel NTSC signal and the response of a comb filter in a receiver.

The coefficients and constant C are selected as follows. The input signal, corrupted with AWGN and co-channel interference, is present at the input to the A/D converter. As shown in FIG. 9, the signal spectrum is aligned with the ATV signal. From the band-edge of the ATV signal, the visual or the picture carrier is 0.904 MHz away. Furthermore the audio carrier is 5.404 MHz away. When the A/D converter samples this signal at the rate of 10.76 MHz, then if $I_k$ represents the baseband co-channel signal and A represents the amplitude of the sound carrier, then the A/D output signal can be approximately written as:

$$s_k + I_k \cos(\pi k/6) + A\cos(\pi k) + n_k,$$

where $s_k$ is the signal component (which could have multipath distortion) and $n_k$ is the AWGN. Note that in general, the interference terms are:

$$I_k \cos\frac{(2\pi\Delta_p k)}{f_s} + A\cos\frac{(2\pi\Delta_a k)}{f_s},$$

where $\Delta_p$ and $\Delta_a$ are the frequency offsets in MHz from the center frequency of the VSB modulated data spectrum, and $f_s$ is the symbol-rate of the ATV signal. It should be clear that these generalized terms can be used to design the interference rejection filter 80 by the same technique as outlined below.

The task of the prediction filter 115 is to extract as much information as possible about the interfering NTSC signal. It is known that most of the power of baseband NTSC waveform lies at low-frequencies; in fact if only the DC component of the signal were removed then an enormous amount of co-channel interference could be removed. Note that the noise also goes through the prediction filter 115. This noise in general will be uncorrelated with the noise in the main path and hence the noise at the output of the summer 118 will have a noise variance which is a sum of the noise variance at the output of the NTSC prediction filter 115 as well as the main path. This causes noise enhancement. Hence, the prediction filter 115 must simultaneously predict the NTSC component while not enhancing the noise to a significant amount. In the following example, only the region around the picture and audio carriers of the NTSC co-channel is predicted which constitutes to a reasonable extent the deterministic part of the NTSC signal.

The comb filter does more than remove low frequency components; it also removes sections of the color sub-carrier in addition to introducing nulls in the interfering NTSC spectrum. The output of the comb filter therefore has a residual interfering signal with a spectrum which is not flat. Thus the trellis decoder, which expects the interfering signal to have a flat spectrum, operates poorly as compared to how it operates with interfering signal which is flat.

Given the fact that the trellis decoder expects an interfering signal spectrum which is approximately flat, it is not necessary to remove all of the energy present at the visual carrier and the sound carrier; it is enough to attenuate it such that the energy present in the region around the visual and the sound carrier is close to the flat part of the NTSC spectrum. Depending on the chosen NTSC spectrum, this attenuation factor for the visual or the sound carrier can vary.

Assume that the attenuation factor chosen for the visual carrier portion is $20*\log(1-D)$ dB for some number D and the attenuation factor chosen for the sound carrier is $20*\log(1-F)$ dB. Thus now assuming N, the number of taps of the NTSC prediction filter 115, it is easy to show that the optimal way of selecting the coefficients $y_1, \ldots, y_N$ and the constant gain C is given by the following minimization problem:

$$C, \min_{y_i} \quad C^2 \sum_{i=1}^{N} y_i^2$$

such that $$<C \sum_{i=1}^{N} y_i \cos(\pi i/6)> = D \text{ and } <C \sum_{i=1}^{N} y_i \cos(\pi i)> = F.$$

s.t.

This is a quadratic programming problem with equality constraints and can be solved by standard techniques as described in "Nonlinear Programming: Theory and Algorithms", authored by M. S. Bazaraa and C. M. Shetty, published by John Wiley in 1979, which is incorporated by reference herein. Actually, the solution provides the value $Cy_j$, $j=1\ldots N$, which is sufficient to describe the NTSC prediction filter. The solution is:

$$Cy_j = \frac{1}{N}[2D\cos(\pi j/6) + F\cos(\pi j)]$$

for $j=1 \ldots N$, and N is a multiple of 6.

If the coefficients $y_1, \ldots, y_N$ are restricted to the values in the set $\{-1, 0, +1\}$ to simplify implementation, then by simple inspection filters which have the above properties can be designed. Two such filters are listed in Table 1 and Table 2.

TABLE 1

24-Tap NTSC Prediction Filter with Tap Values Either +1 or −1. Other Taps are Zero. Constant C = 0.1 (= 1/10). Loss in AWGN Performance = 0.5 dB, Picture Carrier Attenuation = −25 dB, Sound Carrier Attenuation = −14 dB.

| Tap Number | 2 | 5 | 6 | 7 | 10 | 12 | 14 | 17 | 18 | 19 | 22 | 24 |
|---|---|---|---|---|---|---|---|---|---|---|---|---|
| Tap Value | +1 | −1 | −1 | −1 | +1 | +1 | +1 | −1 | −1 | −1 | +1 | +1 |

TABLE 2

36-Tap NTSC Prediction Filter with Tap Values Either +1 or −1. Other Taps are Zero. Constant C = 0.0625 (= 1/16).
Loss in AWGN Performance = 0.3 dB, Picture Carrier Attenuation = −18 dB, Sound Carrier Attenuation = −12 dB.

| Tap Number | 2 | 5 | 6 | 7 | 10 | 12 | 14 | 17 | 18 | 19 | 22 | 24 | 26 | 29 | 30 | 31 | 34 | 36 |
| --- | --- | --- | --- | --- | --- | --- | --- | --- | --- | --- | --- | --- | --- | --- | --- | --- | --- | --- |
| Tap Value | +1 | −1 | −1 | −1 | +1 | +1 | +1 | −1 | −1 | −1 | +1 | +1 | +1 | −1 | −1 | −1 | +1 | +1 |

The 36-tap filter in Table 2 is especially simple to implement since the scaling factor C=1/16, which can be implemented as a scalar shift of four bits in hardware. Also this filter provides noise enhancement of only about 0.3 dB, while still providing attenuation of about 18 dB at the visual carrier and of about 12 dB at the sound carrier. The optimum 36 tap filter using the above equation is able to provide a noise enhancement of only about 0.24 dB while still providing attenuation of about 18 dB at the visual carrier and of about 12 dB at the sound carrier. This is an improvement of only about 0.05 dB over the filter described in Table 2.

Figure 4A:
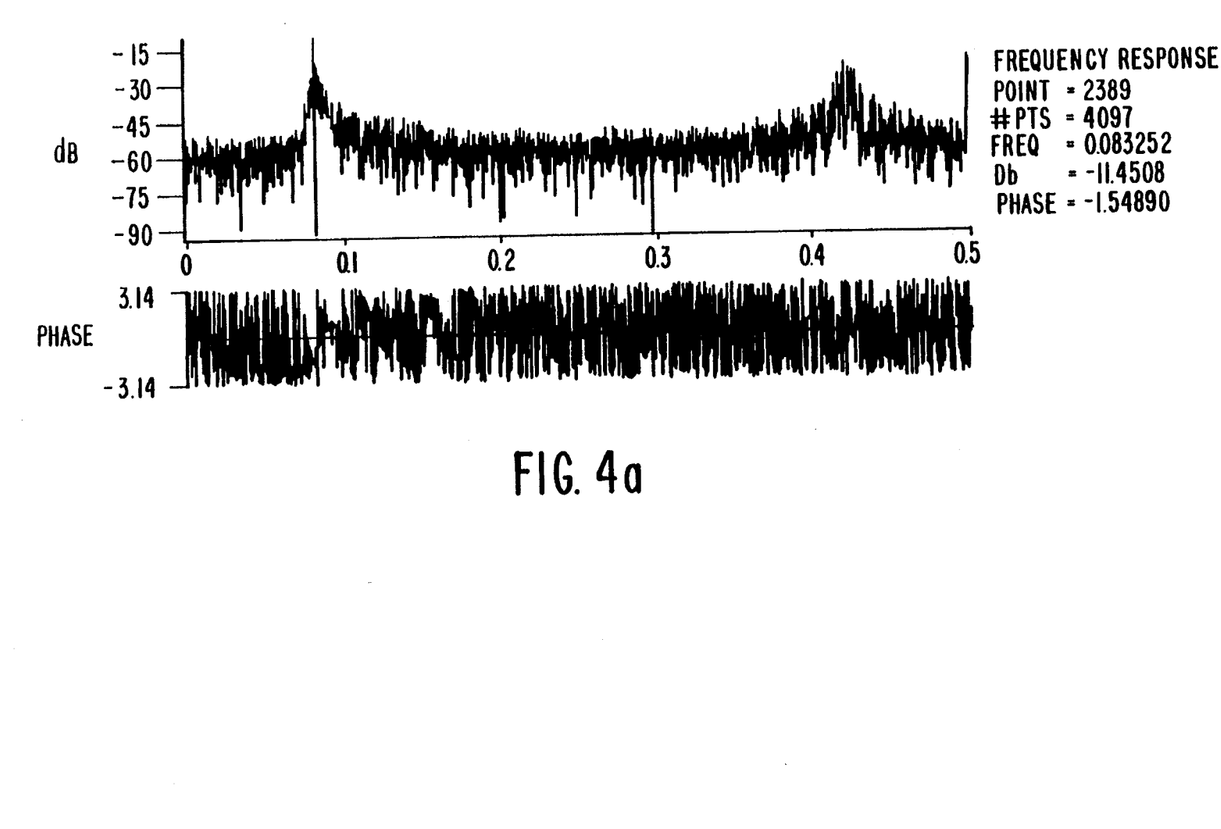
FIGS. 4a–4c illustrate the performance of the interference rejection filter.
Figure 4B:
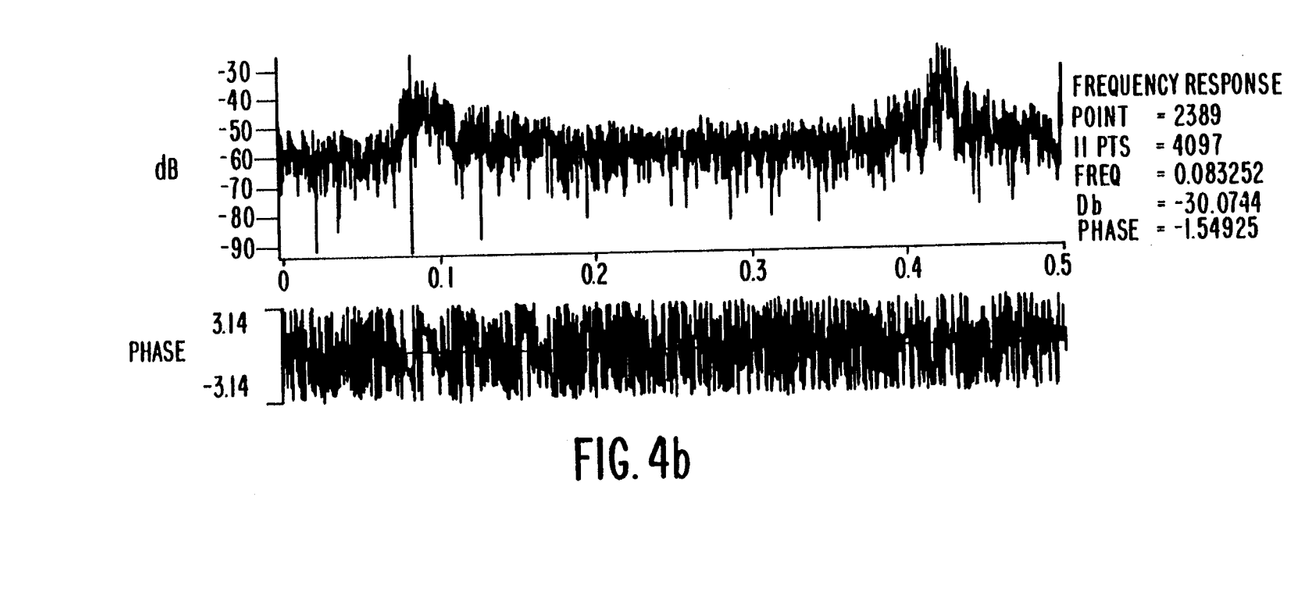
Figure 4C:
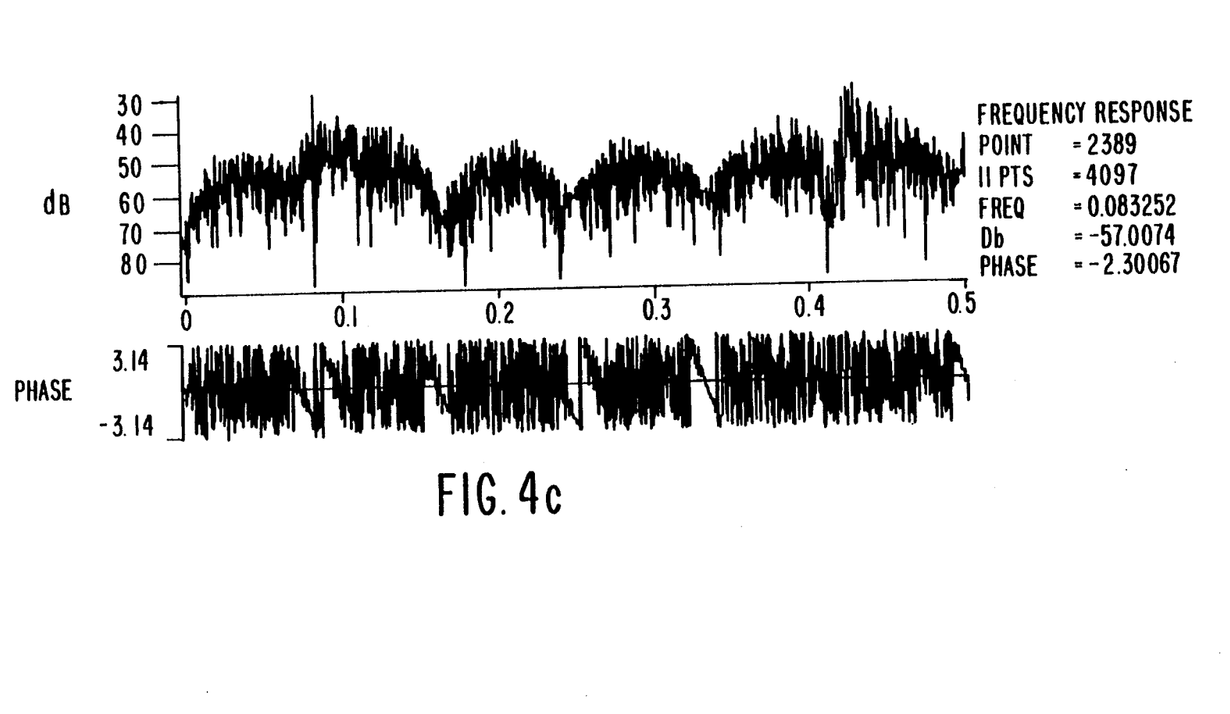

FIGS. 4a–4c show the spectrum of the output (FIG. 4b) of the 36-tap filter in Table 2 when the input (FIG. 4a) is just the interfering NTSC signal. For comparison, the spectrum of the comb filter output (FIG. 4c) is also shown. Note that the spectrum of the residual interference appears more flat in the case of the 36-tap filter (FIG. 4b) when compared to the comb filter (FIG. 4c).

A similar rejection filter can also be designed for the case when QAM is sent. In this case, the rejection filter will operate on the baseband QAM waveform, where now the QAM spectrum is aligned with the NTSC spectrum such that the center frequency of the QAM signal is at 3 MHz. Also the QAM signal will be sampled at half the symbol rate of the VSB signal, approximately 5.38 MHz. In general, the rejection filter will operate on samples which have complex values; even the NTSC waveform will be offset from the QAM center frequency by a frequency shift which has a complex value. The above optimization program can be used to generate a filter for the QAM case as well, as was shown for the simple comb filter in "Precoding Technique for Partial-Response Channels with Applications to HDTV Transmission", by L. F. Wei in IEEE Journal on Selected Areas in Communications, January 1993, pages 127–135, which in incorporated by reference herein.

The above optimization program can also be used to attenuate the color sub-carrier portion as well so that the output spectrum indeed looks flat. The optimization program is modified to include an additional constraint which corresponds to an attenuation at the color sub-carrier.

Also it should be clear that similar techniques can be used for PAL, SECAM and other conventional co-channel signals, where the visual carrier and the sound carrier may be offset differently.

Figure 5:
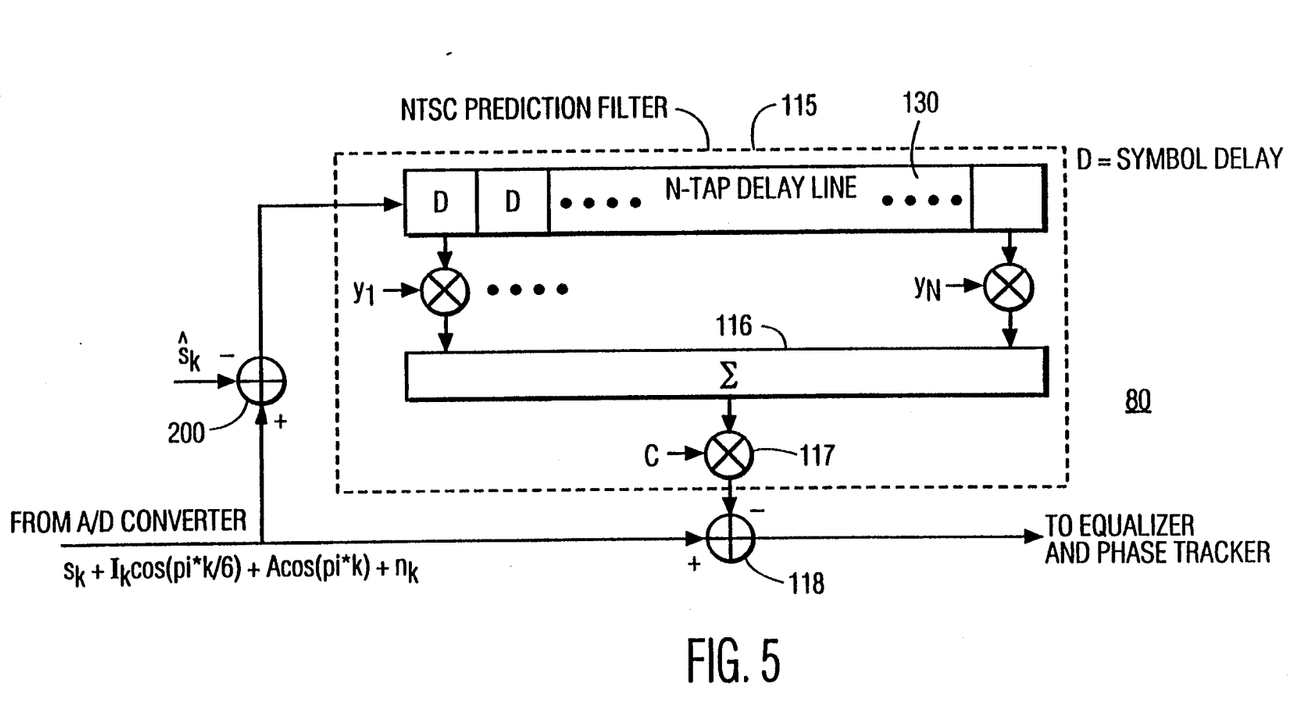
FIG. 5 is a second embodiment of the interference rejection filter modified to remove the signal component by using past decisions at the decoder.

In the embodiment shown in FIG. 3, the interference signal and the noise both go through the prediction filter 115, however the ATV signal also goes through the prediction filter. Perhaps the simplest way this could be removed is as shown in FIG. 5. This embodiment is different from FIG. 3 in only one respect; the subtractor 200 is introduced to remove the ATV signal component, which is obtained from previous decisions. These decisions must be made within one symbol interval. Since decisions, when a trellis encoder/decoder is present, cannot be made within one symbol interval, then these decisions must be made before the trellis decoder, which are error-prone. A similar problem exists with combining equalization with trellis decoding described for instance in "Detection of Coded Modulation Signals on Linear, Severely Distorted Channels Using Decision-Feedback Noise Prediction With Interleaving", by M. V. Eyuboglu in IEEE Transactions on Communications, April 1988, pages 401–409, which is incorporated by reference herein. These error-prone decisions can cause error propagation.

Figure 6:
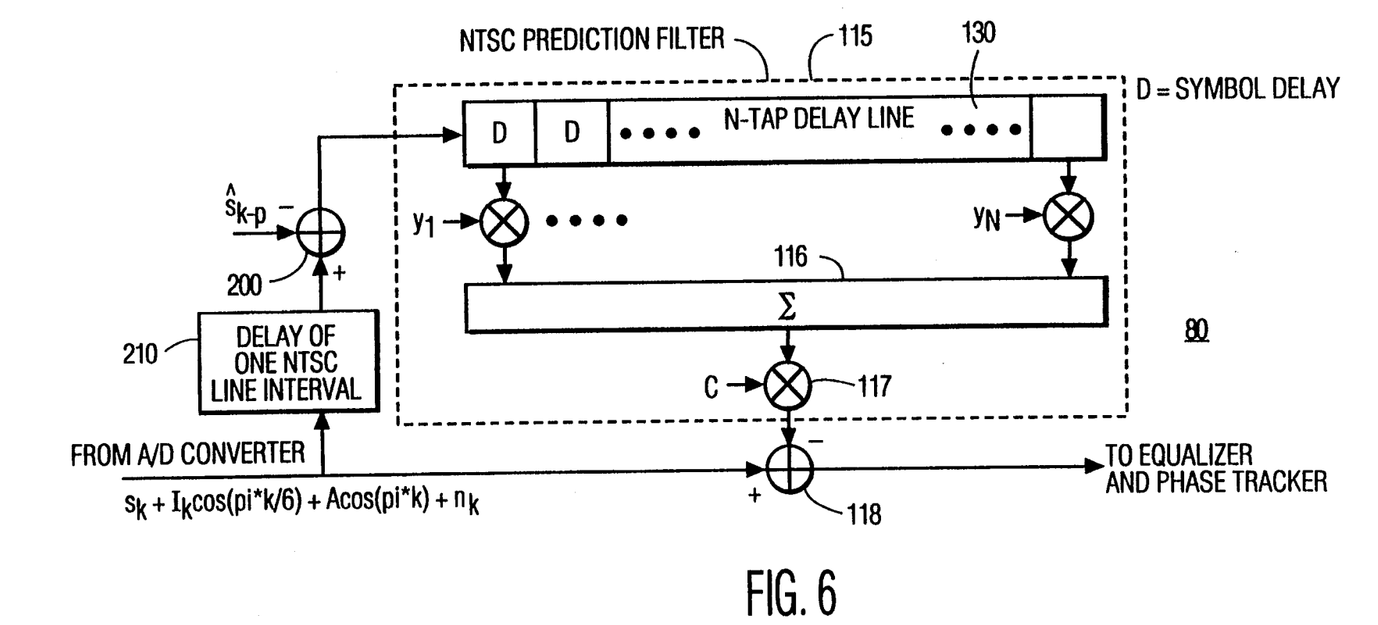
FIG. 6 is a third embodiment of the interference rejection filter modified to remove the signal component by using past decisions at the decoder after a delay of one line interval.

One way these errors can be minimized is to exploit the correlation that exists between the NTSC television lines as far as the low-frequency contents are concerned. Thus if the NTSC signal prediction is made after one line interval delay, thereby allowing the trellis decoder enough time to make reliable decisions, then the error-propagation problem can be solved. This implementation is shown in FIG. 6, where the delay element 210 is introduced. Note that this delay element cannot be exactly equal to the NTSC line interval delay; it is a multiple of the sampling time used by the A/D converter. Given this delay, the optimization problem described above must be modified to account for the delay. Suppose the delay is P symbols. Then the optimization program is modified as:

$$C, \min_{y_i} \quad C^2 \sum_{i=1}^{N} y_i^2$$

$$s.t. \; <C \sum_{i=1}^{N} y_i \cos(\pi(P+i)/6)> \; = D$$

and $$<C \sum_{i=1}^{N} y_i \cos(\pi(P+i))> \; = F.$$

where 's.t.' stands for 'such that'. This method can still be cumbersome, since this involves a delay of one line interval, which involves storage of number of samples.

Another way of removing the influence of the interference rejection filter 80 on the signal component is to precode the data at the transmitter such that after the interference rejection filter 80, the signal distortion due to the NTSC interference rejection filter is removed. This method to compensate for the influence of the interference rejection filter 80 at the receiver on the signal component when such a filter is present is described in "New Automatic Equalizer Employing Modulo Arithmetic", Electronic Letters, pages 138–139, in Mar. 1971, and also in "Matched Transmission Technique for Channels With Intersymbol Interference", IEEE Transactions on Communications, pages 774–780, in Aug. 1972, which are incorporated by reference herein.

Figure 7:
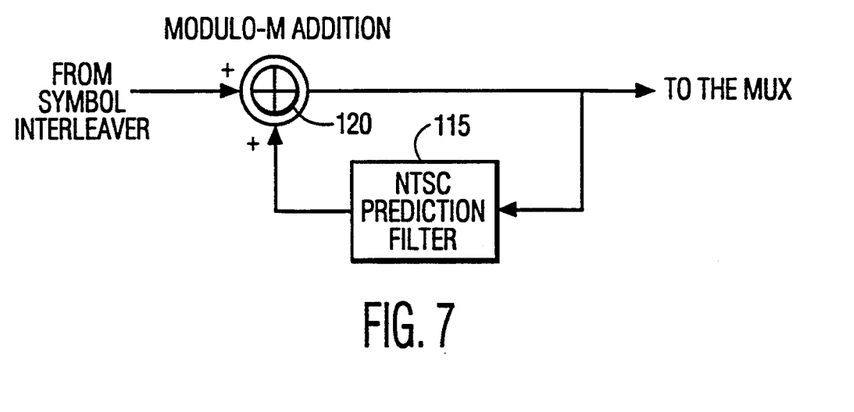
FIG. 7 describes the pre-coder located at the transmitter illustrated in FIG. 1.

A design for pre-coder 25 is shown in FIG. 7. The output of the symbol interleaver 20 is passed through a modulo-M adder 120, which adds its output passed through an NTSC prediction filter 115 like the one at the receiver. The operation of the modulo-M adder 120 is described in "New Automatic Equalizer Employing Modulo Arithmetic" where the value of M is chosen to greater or equal to the peak value of the incoming symbol.

The pre-coder changes the way equalization and phase-tracking must be done at the receiver. This change is described in FIG. 8. The output of the NTSC rejection filter is passed through a forward equalizer 125, the phase offset of which is removed using the multiplier 130, which is fed the phase offset value from the angle-error calculator 170 and the phase-lock-loop 175. The output of the multiplier 130 has residual inter-symbol interference introduced by the channel which is removed by using a feedback equalizer 180.

Figure 8:
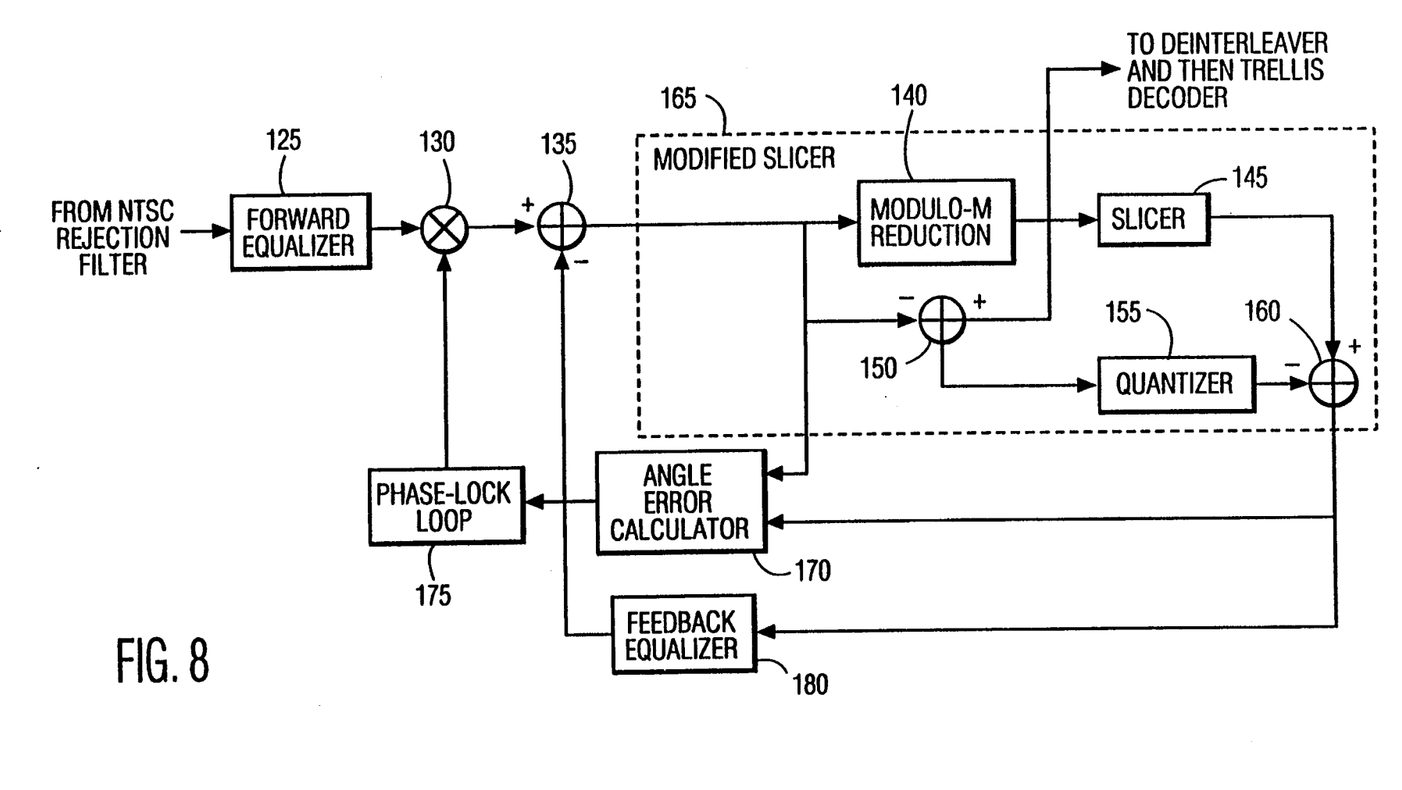
FIG. 8 describes the modified slicer that needs to be used when the interference rejection filter is used along with the pre-coder, to implement the equalizer and the phase tracking circuits.

Both the feedback equalizer 180 and the angle-error calculator 170 are passed the outputs of a "modified" slicer 165, which is the result of pre-coding at the transmitter. In effect, if the modified slicer 165 replaces the slicer in a usual case of no pre-coding, then the entire equalizer and the phase tracker description is exactly the same as described, for example, in "Digital Communication", by E. A. Lee and D. G. Messerschmitt, published by Kluwer Academic Publishers in 1988, which is incorporated by reference herein.

The modified slicer 165 can be described as follows. The input to the modified slicer 165 passes through a modulo-M reduction circuit 140, which simply rescales the input so that the input lies within certain levels, and is described in "Matched-Transmission Technique for Channels With Intersymbol Interference". The slicer now operates on a symbol constellation which are the output of the trellis encoder 15. The input and output of the modulo-M reduction circuit is passed through a subtractor 150, which is then passed through a quantizer 155, which is described in "Matched-Transmission Technique for Channels With Intersymbol Interference". Finally the output of the slicer 145 and the output of the quantizer 155 are passed through a subtractor 160, which forms the output of the modified slicer 165. The output of the modulo-M reduction circuit 140 is sent to the soft-decision symbol deinterleaver and then the trellis decoder as shown.

Other implementations of the equalizer and the phase tracker are also possible, except all the implementations must have the functionality implied by the modified slicer 165 as part of the circuit.

It is clear that while trellis coding has been the primary motivation behind the design of the interference rejection filter 80 and the various methods of removing the signal component, namely the methods of using past-decisions, either immediately or after a delay of one line interval, or of using a pre-coder at the transmitter, the same scheme can also be used for a non-trellis coded case as well.

When NTSC transmission is eventually discontinued, the interference rejection filter at the receiver can easily be removed. Also, the slicer can be changed back to a regular slicer used for data which are not pre-coded. The information noting this change can easily be sent via the training sequence or by employing a higher protocol.

I claim:

1. A television receiver comprising:
   means for receiving a transmitted signal having an encoded digital television signal component and a co-channel interference component;
   means for flattening the frequency spectrum of the co-channel interference component to produce a filtered encoded digital television signal from the transmitted signal, said means for flattening including a prediction filter having fixed coefficients; and
   decoder means for decoding the filtered encoded digital television signal.

2. A television receiver as claimed in claim 1, wherein the encoded digital television signal is a precoded encoded digital television signal, and said prediction filter operates on the transmitted signal.

3. A television receiver as claimed in claim 1, wherein said prediction filter further has a gain factor, and said coefficients are restricted to values in the set $\{-1, 0, +1\}$.

4. A television receiver as claimed in claim 1, wherein said prediction filter operates on a difference signal, said difference signal being the difference between the transmitted signal and a past-decision signal.

5. A television receiver as claimed in claim 1, wherein said prediction filter operates on a difference signal, said difference signal being the difference between the transmitted signal delayed by a time interval and a past-decision signal delayed by said time interval.

6. A television receiver as claimed in claim 5, wherein the time interval is substantially equal to a NTSC line interval delay.

7. A television receiver comprising:
   means for receiving a transmitted signal having an encoded digital television signal component which has had its symbols interleaved at a transmitter and a co-channel interference component;
   means for flattening the frequency spectrum of the co-channel interference component to produce a filtered encoded digital television signal from the transmitted signal, said means for flattening including a prediction filter having fixed coefficients;
   symbol de-interleaving means for de-interleaving the symbols of the filtered encoded digital television signal to produce a de-interleaved digital television signal;
   decoder means for decoding the de-interleaved digital television signal.

8. A television receiver as claimed in claim 7, wherein the encoded digital television signal is a precoded encoded digital television signal, and said prediction filter operates on the transmitted signal.

* * * * *